US012698069B2

(12) United States Patent
L'Her et al.

(10) Patent No.: US 12,698,069 B2
(45) Date of Patent: Aug. 4, 2026

(54) AUTONOMOUS UNDERWATER VEHICLE AND CORRESPONDING GUIDANCE METHOD

(71) Applicant: SERCEL, Carquefou (FR)

(72) Inventors: Christophe L'Her, Carquefou (FR); Pascal Coince, Carquefou (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 18/860,612

(22) PCT Filed: Apr. 25, 2023

(86) PCT No.: PCT/EP2023/060840
§ 371 (c)(1),
(2) Date: Oct. 25, 2024

(87) PCT Pub. No.: WO2023/208951
PCT Pub. Date: Nov. 2, 2023

(65) Prior Publication Data
US 2025/0289545 A1    Sep. 18, 2025

(30) Foreign Application Priority Data

Apr. 26, 2022    (FR) ...................................... 2203859

(51) Int. Cl.
*B63G 8/00* (2006.01)
*G01S 3/802* (2006.01)
*G01V 1/18* (2006.01)

(52) U.S. Cl.
CPC .............. *B63G 8/001* (2013.01); *G01S 3/802* (2013.01); *G01V 1/187* (2013.01); *B63G 2008/004* (2013.01); *B63G 2008/008* (2013.01)

(58) Field of Classification Search
CPC .............. B63G 8/001; B63G 2008/004; B63G 2008/008; G01S 3/802; G01V 1/187
See application file for complete search history.

(56) References Cited

U.S. PATENT DOCUMENTS 9,688,371  B1    6/2017  Ruffa
2012/0020185  A1    1/2012  Welker et al.
(Continued)

FOREIGN PATENT DOCUMENTS

WO      2008156502      12/2008
WO      2016066719      5/2016

OTHER PUBLICATIONS

Martin Jorgenson, "Enhanced Subsea Acoustically Aided Inertial Navigation", 2016, Technical University of Denmark, pp. 1 and 7-24 (Year: 2016).*

(Continued)

*Primary Examiner* — Kenneth M Dunne
(74) *Attorney, Agent, or Firm* — IPSILON USA, LLP

(57)    ABSTRACT

An autonomous underwater vehicle (1) has a housing (10) having a measurement system (13) with three acceleration or speed sensors on different axes from one another, and a processing unit configured to generate seismic data from the received seismic waves (S1) and to determine the direction (D2) of the acoustic waves (S2) transmitted by an acoustic transmitter (20) from a base (2) which are received by at least two sensors of the measurement system (13). The processing unit generates and transmits, to the navigation system (12), guidance data relating to the determined direction (D2) of the received acoustic waves (S2). The navigation system (12) is configured to control the propulsion and steering system (11) of the vehicle according to the guidance data in order to guide the movement of the vehicle towards the base.

18 Claims, 5 Drawing Sheets

(56)     References Cited

U.S. PATENT DOCUMENTS

| 2013/0231802 A1 | 9/2013 | Heard et al. | |
| 2018/0222560 A1* | 8/2018 | Postic | G01V 1/3808 |
| 2019/0155310 A1* | 5/2019 | Kim | G01C 21/203 |
| 2019/0256181 A1 | 8/2019 | Valsvik et al. | |
| 2019/0283848 A1 | 9/2019 | Guevel et al. | |
| 2019/0353815 A1 | 11/2019 | Postic et al. | |

OTHER PUBLICATIONS

Caffaz et al, "The Hybrid Glider/Auv Folaga", 2010, IEEE, Robotics and Automation Magazine (Year: 2010).*
International Search Report dated Nov. 17, 2022.

* cited by examiner

AUTONOMOUS UNDERWATER VEHICLE AND CORRESPONDING GUIDANCE METHOD

RELATED APPLICATION

This application is a National Phase of PCT/EP2023/060840 filed on Apr. 25, 2023, which claims priority to French Patent Application No. 22 03859 filed on Apr. 26, 2022, the entirety of which are incorporated by reference.

FIELD OF THE INVENTION

The present invention relates generally to the field of autonomous underwater vehicles or AUVs, used as ocean bottom seismic sensors or OBNs (which stands for Ocean Bottom seismic Nodes).

PRIOR ART

Increasing use is being made of autonomous underwater vehicles, or AUVs, which can notably have individualized movement based on various technologies, as described for example in patents or patent applications U.S. Pat. No. 8,600,592, US2004/065247 or U.S. Pat. No. 9,688,371.

One solution for guidance is the acoustic guidance of autonomous underwater vehicles using USBL (Ultra Short Baseline) or phase array technology. This solution consists in regularly emitting, from the recovery base, an acoustic signal which is received by an acoustic sensor of the vehicle.

One of the problems posed by the acquisition of seismic data, described for example in document WO2008/156502, is the recovery of the seismic sensors in order to extract the data they record.

Thus, it has been proposed to use, as ocean bottom seismic sensors, autonomous underwater vehicles which can be deployed on the seabed and return without direct handling to their recovery base which may be located underwater.

Applications WO2016066719A1 or US20210173110A1 propose underwater machines for seismic acquisition which are equipped with buoyancy or deballasting means, or with a propulsion system, and which can use a USBL type communication system for guiding the machines.

However, USBL or phase array type acoustic sensors capable of providing the information necessary to guide an underwater vehicle are expensive and bulky, such that the resulting vehicle is also expensive and large in size, which goes against usual practice in seismic prospecting.

Furthermore, deciding where to locate an acoustic sensor, which is sensitive to acoustic waves, on the vehicle usually comes down to a difficult compromise between the acoustic viewing angle of the vehicle to detect acoustic waves wherever the base is positioned, and the hydrodynamic drag of the machine.

Document US2019353815 describes an ocean bottom vehicle for recording seismic signals on the seabed. The ocean bottom seismic vehicle comprises an arched buoyant body coupled to a substantially flat bottom metal plate.

Document US2019256181 describes an autonomous underwater vehicle, or AUV, for recording seismic signals on the seabed during a marine seismic survey. The AUV includes a propulsion system configured to propel and steer the AUV and seismic sensors configured to record seismic signals while the AUV rests on the ocean floor.

Document US2012020185 describes a probe, commonly called a glider, which is towed to a seismic vessel via a tow cable. A cable guide is used to reduce the risk of entanglement by guiding the tow cable into the water at a distance removed from the seismic spread. The probe is steerable to steer the probe and tow cable away from the seismic spread.

The aim of the present invention is to propose a new autonomous underwater vehicle and a corresponding guidance method making it possible to overcome all or some of the problems set out above.

SUMMARY OF THE INVENTION

To this end, the invention relates to an autonomous underwater vehicle, said vehicle comprising a housing which includes:
  a system for driving and steering the vehicle making it possible to move and steer the vehicle in the water;
  a navigation system making it possible to control the system for driving and steering the vehicle in order to control the movement of the vehicle toward a recovery base which comprises an acoustic transmitter;
  a measuring system comprising three acceleration or speed sensors on axes that are different to one another, making it possible to receive seismic waves to generate corresponding seismic data;
  a processing unit configured to operate in a seismic acquisition mode in which the processing unit generates seismic data from the seismic waves received;
  a system for storing the seismic data;
characterized in that at least two of said sensors of said measuring system which are capable of receiving seismic waves are also capable of receiving acoustic guidance waves emitted by the acoustic transmitter of the base; and
the processing unit is also configured to be able, when the vehicle is decoupled from the floor of the seabed, to operate in a movement guidance mode according to which the processing unit is configured to:
    determine the direction of the acoustic guidance waves emitted by the acoustic transmitter of the base which are received by said at least two sensors of said measuring system;
    generate and transmit to the navigation system, guidance data relating to the determined direction of the acoustic waves received,
the navigation system being configured to control the system for driving and steering the vehicle as a function of the guidance data so as to guide the movement of the vehicle toward the base.

Thus, the same measuring system is used at one time for seismic acquisition and at another time to determine the direction in which the base is located relative to the vehicle. This allows for a reduction in cost, an increase in reliability, a weight saving, and ease of integration of the vehicle.

Note that in document US2012020185, the object (glider) which includes sensors associated with a seismic vessel is very different from an autonomous underwater vehicle used to take seismic measurements. The weight in water of such a glider is less than one kilogram, for example of the order of 300 grams in water, and it may even float depending on its phase of flight, whereas an autonomous underwater vehicle (AUV) used for seismic purposes has a weight in water of several kilograms to ensure good coupling of the vehicle to the seabed.

The sensors used in gliders have a high electrical noise level, usually of the order of several hundred ng/√Hz, which is adapted to the fact that the measurement carried out is an acoustic measurement in the water column and that the object to which they are coupled (the glider) is lightweight.

Such sensors cannot be used efficiently (or reliably) with autonomous underwater vehicles (AUVs) because the high weight of the latter means that taking a seismic measurement, when the vehicle is coupled to the seabed, with such high noise level sensors, would generate poor quality seismic measurements. Furthermore, the performance of a vector acoustic measurement from an underwater machine depends on its weight in the water. Thus, a machine that is heavy in water requires the use of low noise sensors to obtain good acoustic measurement performance. As a result, the high noise level of the sensors used in gliders means that these sensors cannot be used in heavy autonomous underwater vehicles (AUVs) to efficiently (or reliably) determine the direction of acoustic waves received by said autonomous underwater vehicles (AUVs).

The vehicle may also include one or more of the following features, in any technically feasible combination.

According to an embodiment of the invention, the autonomous underwater vehicle has a weight in water of several kilograms, for example greater than 5 kg.

According to an embodiment of the invention, the three acceleration or speed sensors of the measuring system have a noise level of less than 50 ng/√Hz, for example a noise level of 15 ng/√Hz. According to an embodiment of the invention, the three acceleration or speed sensors of the measuring system which are capable of receiving seismic waves are also capable of receiving acoustic guidance waves emitted by the acoustic transmitter of the base, and, in movement guidance mode, the processing unit is configured to determine the direction of the acoustic guidance waves emitted by the acoustic transmitter of the base which are received by the three sensors of said measuring system.

The fact that the three acceleration or speed sensors of the measuring system, which are capable of receiving seismic waves, are also capable of receiving acoustic guidance waves emitted by the acoustic transmitter of the base, makes it possible to guide the vehicle in three dimensions, in particular up-down and left-right.

According to an embodiment of the invention, the housing comprises a wall capable of coming into contact with the floor, said measuring system making it possible to receive seismic waves in the coupled state in which the vehicle is coupled with the floor of the seabed.

The three acceleration or speed sensors of the measuring system may thus receive S-type seismic waves, also referred to as shear waves, when the vehicle is coupled to the seabed. The three acceleration or speed sensors of the measuring system may be implemented as a 3-axis accelerometer system.

In the solution in document US2012020185, the probe acquires P waves (pressure waves) in the water column, but the probe is neither used nor designed to acquire S-type seismic waves while coupled to the seabed. The probe in document US2012020185 is what those skilled in the art usually call a "glider", which is configured to remain in the water column.

According to an embodiment of the invention, for determining the direction of acoustic waves received by the vehicle, in the decoupled state of the vehicle relative to the seabed, the processing unit is configured to determine said direction by comparing the energy levels measured on the different axes, i.e. by comparing the energy levels received by the different acceleration or speed sensors. According to an embodiment of the invention, the measuring system is coupled to the wall of the housing capable of coming into contact with the floor, so as to be able to receive the seismic waves when the vehicle is coupled to the floor of the seabed to carry out a seismic acquisition operation.

According to an embodiment of the invention, said acceleration or speed sensors of the measuring system are accelerometers formed by a microelectromechanical system.

According to an embodiment of the invention, the measuring system also comprises a hydrophone.

Preferably, the vehicle comprises a single hydrophone which is used to determine whether the wave received comes from port or starboard. Note that the solution in document US2012020185 requires the presence of two hydrophones which are used to measure an angle and not to determine whether a wave received comes from port or starboard.

According to an embodiment of the invention, the measuring system and the processing unit are located on the same electronic board included in the housing of the vehicle.

According to an embodiment of the invention, the processing unit comprises an operating mode selection module making it possible to switch:

from seismic acquisition mode, which may be activated preferably when the vehicle is coupled with the floor of the seabed, to allow a seismic acquisition operation to be carried out, to movement guidance mode.

The invention also relates to an assembly comprising a vehicle according to any one of the preceding embodiments, and a recovery base which comprises an acoustic transmitter.

According to an embodiment of the invention, the acoustic transmitter of the recovery base is configured to emit acoustic guidance waves with a frequency of between 50 and 800 Hz.

The invention also relates to a method for guiding an autonomous underwater vehicle in accordance with any of the preceding embodiments, the method comprising the following steps:

positioning the vehicle relative to the floor of the seabed;

performing an operation for the acquisition of seismic data from the seismic waves received by the measuring system;

where appropriate, decoupling the vehicle from the floor of the seabed;

reception by said measuring system of acoustic guidance waves emitted by the transmitter of the recovery base;

determining the direction of the acoustic guidance waves received;

controlling the movement of the vehicle toward the recovery base, as a function of the determined direction of the acoustic guidance waves received.

According to an embodiment of the invention, determining the direction of the acoustic waves received by the measuring system and emitted by the transmitter of the base is carried out by:

an arc-tangent type method;

a method based on the intensity measured on each axis of said at least two sensors of the measuring system; or a beamforming method.

According to an embodiment of the invention, the positioning of the vehicle relative to the floor of the seabed is achieved by coupling a wall of the housing of the vehicle with the floor.

BRIEF DESCRIPTION OF THE DRAWINGS

Further features and advantages of the invention will emerge from the description below, which is purely illustrative and non-limiting and should be read in conjunction with the appended drawings, in which.

DETAILED DESCRIPTION

Figure 1:
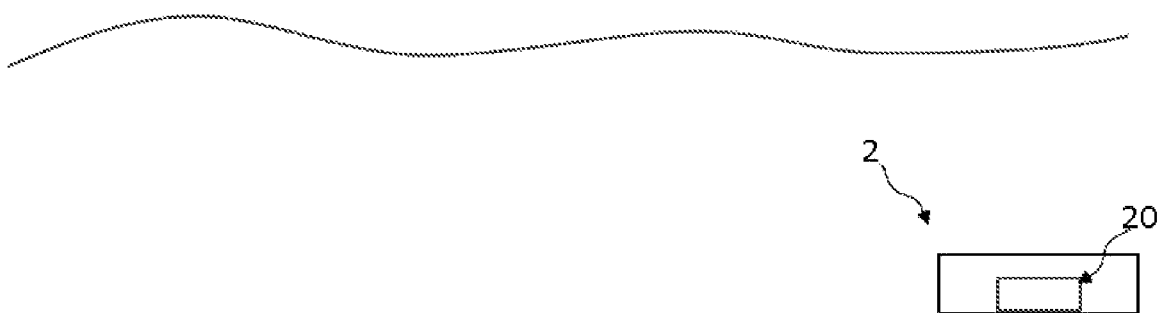
FIG. 1 is a schematic view of an autonomous underwater vehicle according to an embodiment of the invention, the vehicle being coupled to the floor of the seabed, for a seismic acquisition operation carried out with a measuring system included in the vehicle which receives seismic waves reflected by a layer of the subfloor.
Figure 1:
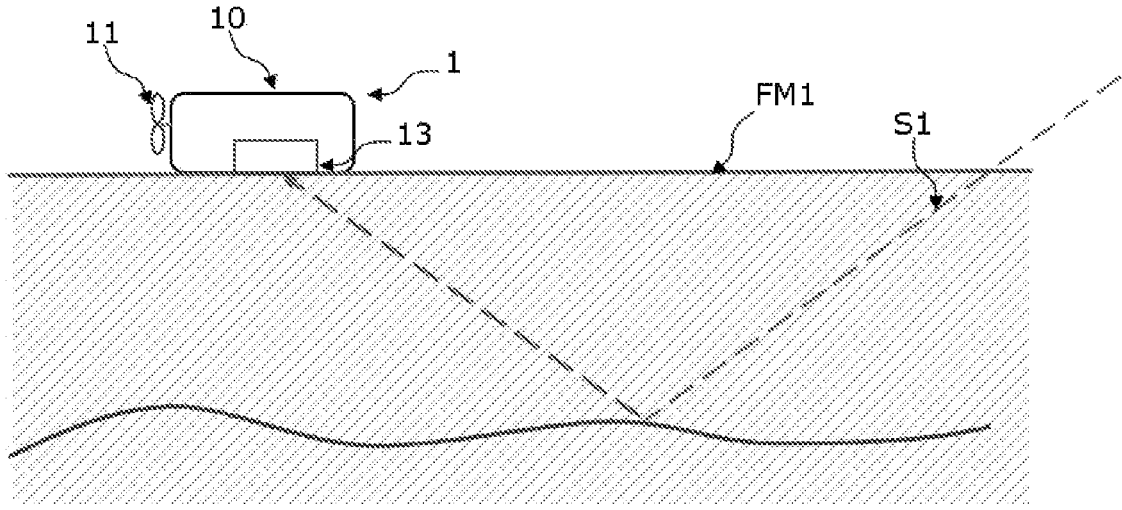
Figure 2:
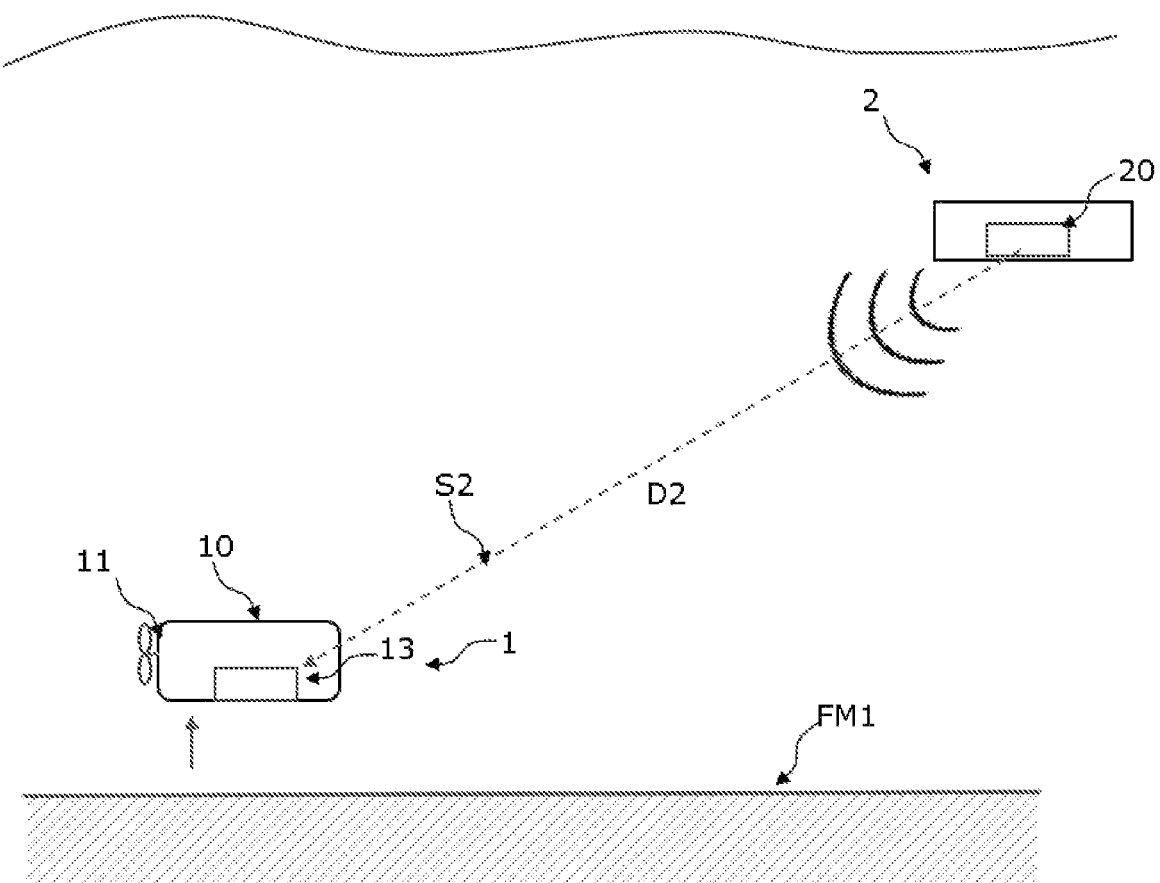
FIG. 2 is a schematic view of an autonomous underwater vehicle according to an embodiment of the invention, the vehicle being decoupled from the floor of the seabed, and the measuring system receiving acoustic guidance waves emitted into the water by a recovery base.
Figure 3:
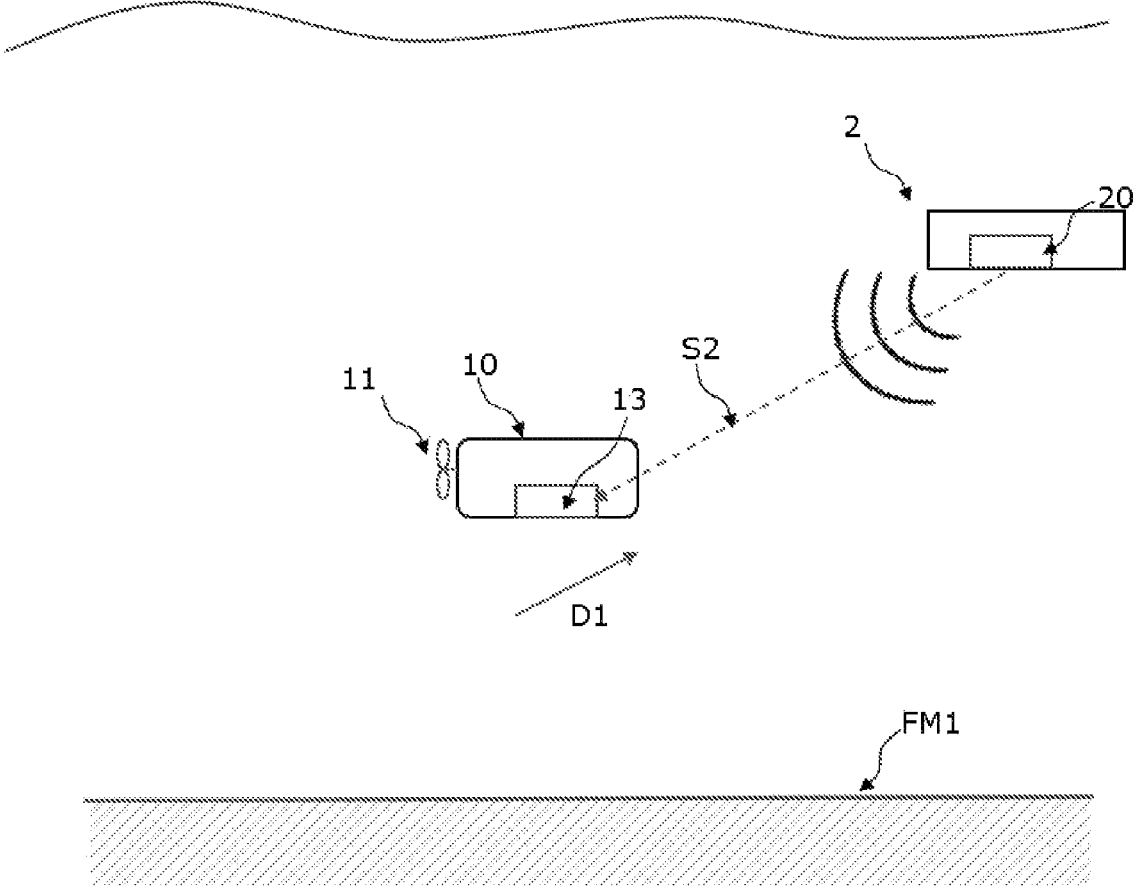
FIG. 3 is a schematic view of the autonomous underwater vehicle of FIG. 2 heading toward the recovery base, as a function of the acoustic guidance waves received by its measuring system.
Figure 4:
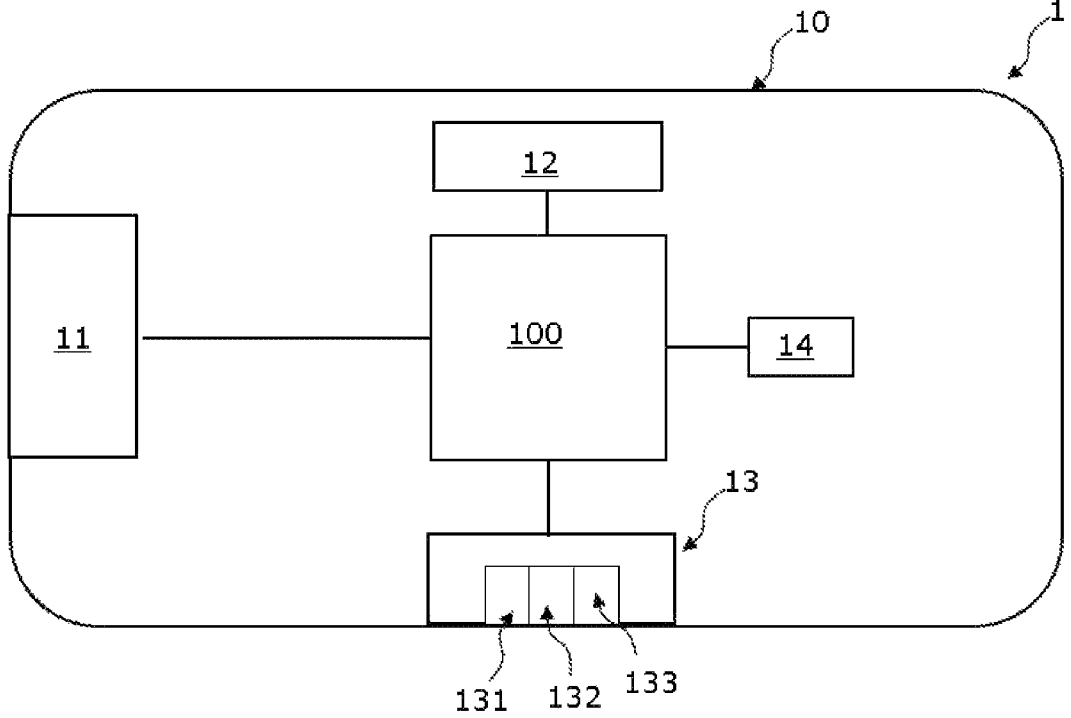
FIG. 4 is a schematic view of an autonomous underwater vehicle according to an embodiment of the invention, several elements of said vehicle being depicted in the form of blocks.

The invention is described more fully hereinafter with reference to the accompanying drawings, in which embodiments of the invention are shown. In the drawings, the size and the relative sizes of the elements may be exaggerated for the sake of clarity. Similar numbers refer to similar elements in all the drawings. However, the invention may be embodied in many different forms and should not be construed as being limited to the embodiments set forth herein.

A reference throughout the specification to "an embodiment" means that a particular functionality, structure, or feature described in connection with an embodiment is included in at least one embodiment of the present invention. Thus, the appearance of the expression "in an embodiment" at various points throughout the specification does not necessarily refer to the same embodiment. Furthermore, the particular functionalities, structures, or features may be combined in any suitable manner in one or more embodiments.

With reference to the figures, they depict an autonomous underwater vehicle that may be used for seismic acquisition on the seabed.

The life cycle of such an autonomous underwater vehicle used for seismic acquisition usually includes three main phases:

- a vehicle deployment phase to position the vehicle at a given location on the floor of the seabed;
- a seismic data acquisition phase in the coupled state in which the vehicle is coupled with the floor of the seabed;
- a vehicle recovery phase for recovering the seismic data recorded in the vehicle.

Alternatively and as described in application WO2013092747 A1, the vehicle deployment phase may be carried out by positioning the vehicle in the water at a distance from the floor of the seabed, and the seismic data acquisition phase may be carried out in the decoupled state in which the vehicle is decoupled from the floor of the seabed.

The deployment and recovery phases are phases in which the vehicle is moving in and relative to the water column. The movement of the vehicle may be vertical and/or horizontal.

According to an embodiment, the acquisition phase is carried out in the absence of movement of the vehicle, when the vehicle is coupled to the floor. In the state coupled to the floor, the vehicle rests fixedly on the floor, i.e. without any degree of freedom relative to the surrounding environment.

As described in detail below, the measuring system comprises several acceleration or speed sensors on different axes, for example three sensors each making it possible to detect an acceleration or speed on an axis different to that of the other sensors. The detection axes may be perpendicular to one another. These sensors, also called seismic sensors, are used during a seismic acquisition phase in which the vehicle is, according to an embodiment, coupled to the floor of the seabed, to receive seismic waves and make it possible to generate seismic data.

According to the invention, and contrary to usual practice, the same measuring system is used to implement, at separate times, the seismic acquisition operation and the guidance operation. "The same measuring system" means that the sensors of the measuring system which are used for the guidance of the vehicle with a view to its recovery are sensors of the measuring system which are also used for seismic acquisition, and not separate additional sensors as is the case in the prior art.

Autonomous Underwater Vehicle

The autonomous underwater vehicle comprises a vehicle drive and steering system 11, making it possible to move and steer the vehicle in the water. The drive function of the system 11 may be achieved using buoyancy means, deballasting means, and/or a propulsion system. The steering function of the system 11 may be achieved, for example, with a system of rudders or steerable fins.

The autonomous underwater vehicle also comprises a navigation system 12 which makes it possible to control the vehicle drive and steering system 11 to control the movement of the vehicle in a given direction toward a recovery base 2.

The autonomous underwater vehicle comprises a measuring system 13 which comprises acceleration or speed sensors making it possible to receive seismic waves S1 to generate corresponding seismic data.

The sensors are capable of receiving seismic waves which are reflected by the floor and/or the layers of the subfloor in reaction to a vibration of the earth or a wave emitted by a source.

The autonomous underwater vehicle comprises a processing unit 100 which makes it possible to process the signals generated by the sensors which receive the seismic waves S1, to generate seismic data which are stored in a seismic data storage system 14, such as a data memory.

Provision may be made for a part of the processing unit 100 to be included in the measuring system 13.

Measuring System

The vehicle has a housing 10 which forms the body of the vehicle and in which the measuring system 13 is housed.

According to an embodiment and as shown in FIG. 1, the measuring system 13 comprises three acceleration or speed sensors 131, 132, 133 on axes that are different to one another (preferably orthogonal to one another), which make it possible, for example in the coupled state in which the vehicle 1 is coupled with the floor of the seabed FM1, to receive seismic waves S1 to generate corresponding seismic data. The sensors may thus be referred to as seismic sensors, and the set of three (single-axis) seismic sensors can be considered to constitute a 3-axis seismic sensor.

According to a preferred embodiment, said acceleration or speed sensors 131, 132, 133 of the measuring system 13 are accelerometers formed by a microelectromechanical system, also called a MEMS. The microelectromechanical system that forms the three accelerometers can be considered to constitute a 3-axis accelerometer.

According to a particular embodiment, the measuring system 13 used is a digital MEMS sensor referenced QuietSeis™ available from the company SERCEL.

According to an alternative embodiment, provision may be made for the sensors of the sensor system to comprise three geophones (speed sensors) oriented along three different detection axes, preferably orthogonal to one another. Acceleration may be obtained by differentiating velocity with respect to time.

According to an embodiment, the measuring system 13 is housed inside the housing 10 which forms the body of the vehicle, being coupled to said housing, preferably secured to a wall which is intended to come into contact with the floor of the seabed FM1 in the state coupled to the floor of the seabed, to carry out a seismic acquisition operation. In other words, the wall of the housing 10 to which the measuring system 13 is attached is a wall the outer face of which forms the bottom of the housing in the state coupled to the floor.

As explained above, said acceleration or speed sensors 131, 132, 133 of the measuring system 13 are thus considered to constitute single-axis seismic sensors, and as a whole these acceleration or speed sensors of the measuring system 13 can be considered to constitute a multi-axis seismic sensor.

Vector Sensor Function

The exterior of the housing 10 is in contact with the water such that, in the decoupled state of the vehicle relative to the floor of the seabed FM1 (in other words, when the vehicle is surrounded by water and is not resting on the floor of the seabed), the housing 10 forms an acoustic membrane through which the measuring system 13 is able to acquire the acoustic guidance waves emitted by the base 2. Thus, in the decoupled state of the vehicle relative to the floor, the assembly of the vehicle housing 10 and the measuring system 13 forms a vector sensor.

In particular, MEMS accelerometer type seismic sensors have suitable performance and sensitivity for, in the decoupled state of the vehicle relative to the floor of the seabed, processing signals corresponding to the acoustic waves emitted into the water by the transmitter of the recovery base in order to determine the angles of arrival of said acoustic waves. The angles of arrival of said acoustic waves are determined at least in two dimensions, preferably in three dimensions, so as to be able to guide the vehicle toward the base emitting said acoustic waves.

Provision may thus be made for the processing unit to use the acoustic waves received by two of the acceleration or speed sensors of the measuring system to determine the angles of arrival of acoustic waves in two dimensions, or the acoustic waves received by the three acceleration or speed sensors of the measuring system to determine the angles of arrival of acoustic waves in three dimensions.

The analysis and processing of the signals corresponding to the acoustic guidance waves emitted by the base are only carried out when the underwater vehicle is in its navigation phase, that is to say when the underwater vehicle is not coupled to the floor of the seabed.

The vehicle may be kept decoupled from the floor, that is to say at a distance from the floor, by the vehicle drive and steering system 11, which may comprise a buoyancy or deballasting system, and/or a propulsion device. The fact that the vehicle is in the water at a distance from the floor makes it more sensitive to the acoustic guidance waves emitted in the water which may then be detected efficiently by the acceleration or speed sensors of the measuring system 13 through the wall of the housing 10 of the vehicle which serves as an acoustic membrane between the water and the measuring system.

To estimate the angles of arrival of the acoustic guidance waves, various methods known per se to those skilled in the art may be used. These methods may include in particular:

an arc-tangent type method, a method based on the intensity measured on each channel of the vector sensor, i.e. on each axis of the acceleration or speed sensors of the measuring system, or a beamforming method.

According to a preferred embodiment, the beamforming method is used because this method provides good angle determination accuracy in a marine environment.

The use for vehicle guidance, in the state decoupled from the floor, of all or some of the same sensors of the measuring system as are used, at a separate time, for seismic acquisition in the state of the vehicle coupled to or decoupled from the floor, means that it is not necessary to provide specific additional sensors dedicated to the reception of acoustic guidance waves for guiding the vehicle in the water.

In particular, there is no need to use an additional electronic board specifically for detecting acoustic guidance waves, such that the cost and the size of the vehicle may be reduced.

According to an embodiment, the measuring system 13 also comprises a hydrophone. The use of a hydrophone makes it possible to remove uncertainty concerning the left-right direction of movement of the vehicle. This option also allows the use of other arrival trajectory calculation processing operations by combining the hydrophone signal with the measurement channels of the measuring system (MEMS).

Recovery Base

The recovery base 2 comprises an acoustic transmitter 20.

According to an embodiment, the acoustic transmitter of the recovery base 2 is configured to emit acoustic guidance waves S2 with a frequency of between 50 to 750 or 800 Hz.

It is thus possible to guide the vehicle toward a recovery base located more than 1 km away from the vehicle. In the case where the measuring system is of MEMS type, the reception range is improved owing to the low frequency of the acoustic guidance signals, unlike conventional USBL technology.

The processing unit for example takes the form of a processor and a data memory in which computer instructions executable by said processor are stored, or the form of a microcontroller.

The functions and steps described may be implemented as a computer program or via hardware components (e.g. programmable gate arrays). In particular, the functions and steps performed by the processing unit and/or by the navigation system may be carried out by sets of instructions or computer modules implemented in a processor or controller or may be carried out by dedicated electronic components or FPGA or ASIC type components. It is also possible to combine computer parts and electronic parts.

The processing unit is thus an electronic and/or computer unit. Where it is specified that said unit is configured to perform a given operation, this means that the unit comprises computer instructions and the corresponding means of execution which allow said operation to be performed and/or that the unit comprises corresponding electronic components.

According to a preferred embodiment, the measuring system 13 and the processing unit 100 are located on the same electronic board included in the housing 10 of the vehicle. In other words, a single electronic board takes over all the functions associated with the measuring system (or measuring unit) and with the transmission of information to the navigation system.

Method

Figure 5:
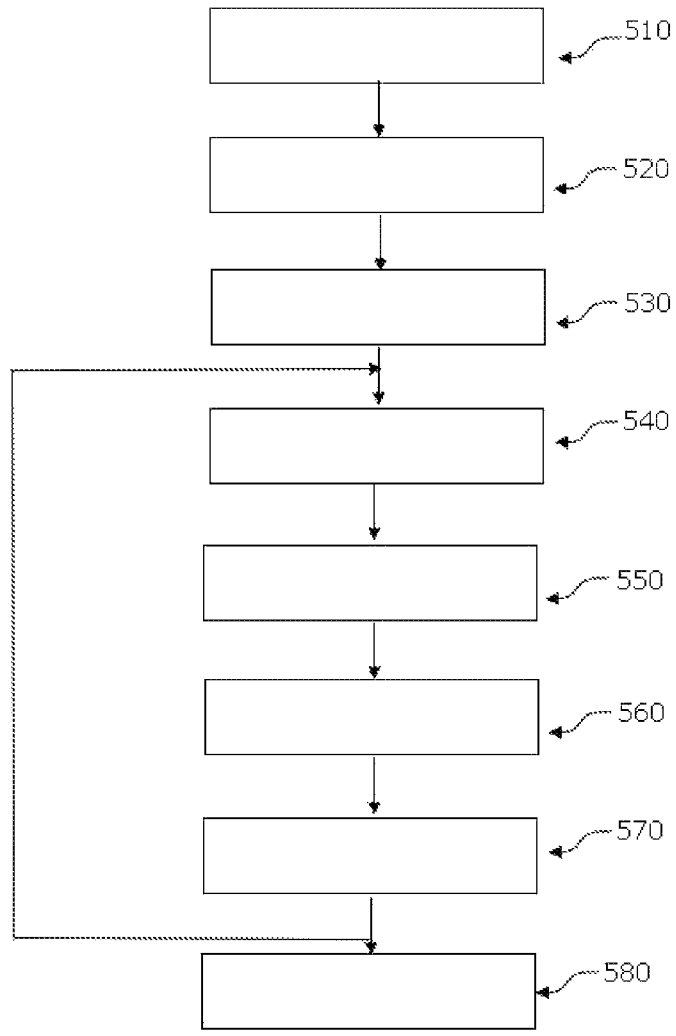
FIG. 5 is a flowchart showing several steps of a guidance method according to an embodiment of the invention.

An example of a method for guiding an autonomous underwater vehicle 1 is proposed below, in connection with FIG. 5.

The method comprises the following steps. At step 510, the vehicle 1 is coupled with the floor of the seabed FM1. Coupled means that the vehicle is in contact with the floor of the seabed and fixed in such a way as to enable the measuring system to detect, through the wall of the housing in contact with the floor, seismic waves reflected by one or more layers of the seabed subfloor.

Thus, coupling may be achieved by positioning the vehicle on the floor of the seabed such that the wall of the vehicle housing 10 to which the measuring system 13 is attached inside the housing, is in contact with the floor of the seabed.

According to an alternative embodiment, the vehicle 1 is not coupled with the floor of the seabed FM1. The vehicle is positioned in the water at a distance from the floor of the seabed, and the measuring system 13 makes it possible to detect seismic waves transmitted in the water.

At step 520, the processing unit 100 triggers a seismic data acquisition operation. During the seismic data acquisition operation, the measuring system 13 receives seismic waves S1. In the example illustrated in the figures, the sensors 131, 132, 133 of the measuring system detect the amplitudes of the seismic waves on three different axes. The signals generated by the sensors corresponding to the seismic waves S1 received are processed by the processing unit 100 to generate seismic data. The seismic data are stored in a storage system 14 such as a data memory.

After the seismic acquisition phase, the vehicle ends up in a state decoupled from the floor (step 530) (or alternatively the vehicle remains in a state decoupled from the floor). Specifically, provision may be made for the processing unit 100 to receive an order, for example from a control unit of the vehicle, to switch to guidance mode, or for the processing unit 100 to be configured to detect that the vehicle 1 is moving or at a distance from the floor of the seabed FM1, and for, following detection of a decoupled state or end of seismic acquisition, the processing unit 100 to then switch to guidance mode. Alternatively, it is also possible to provide for the processing unit 100 to be configured to, after a seismic acquisition phase with the vehicle in the state coupled to the floor, control the separation of the vehicle from the floor, by deballasting or activating a propulsion device, so as to cause its decoupling, then to directly switch to guidance mode for processing the signals corresponding to the acoustic guidance waves received by the measuring system and emitted by the transmitter 20 of the base 2.

At step 540, the transmitter 20 of the base 2 emits acoustic guidance waves. Provision may be made for the base 2 to be configured to emit the acoustic guidance waves only when the seismic acquisition phase or phases are complete.

In the decoupled state of the vehicle relative to the floor, the or at least some of the sensors of the measuring system 13 which were used to receive the seismic waves S1 and generate seismic data, are then also used to receive (step 550) the acoustic guidance waves S2 emitted by the transmitter 20 of the recovery base 2.

In step 560, the processing unit 100 then processes the signals corresponding to the acoustic guidance waves received by the sensors of the measuring system 13, and determines the angles of arrival of the corresponding acoustic waves.

The processing unit 100 can deduce from the angles determined the direction D2 in which the base 2 is located and can then provide, in step 570, guidance data to the navigation system 12. The direction D2 of the acoustic guidance waves S2 received may be determined for example using an arc-tangent method, or by using a method based on the intensity measured on each sensor detection axis, or a beamforming method.

The navigation system 12 converts this guidance data into a control instruction so as to control the vehicle driving and steering system 11, in order to guide the movement of the vehicle toward the base. Steps 540 to 570 may be repeated until the vehicle arrives at the base (step 580).

The invention is not limited to the embodiments illustrated in the drawings.

Furthermore, the term "comprising" does not exclude other elements or steps. Moreover, features or steps that have been described with reference to one of the embodiments set forth above may also be used in combination with other features or steps of other embodiments set forth above.

The invention claimed is:

1. An autonomous underwater vehicle, said vehicle comprising a housing which includes:

a system for driving and steering the vehicle making it possible to move and steer the vehicle in the water;

a navigation system making it possible to control the system for driving and steering the vehicle in order to control the movement of the vehicle toward a recovery base which comprises an acoustic transmitter;

a measuring system comprising three acceleration or speed sensors on axes that are different to one another, making it possible to receive seismic waves to generate corresponding seismic data;

a processing unit configured to operate in a seismic acquisition mode in which the processing unit generates seismic data from the seismic waves received;

a system for storing the seismic data;

wherein at least two of said sensors of said measuring system which are capable of receiving seismic waves are also capable of receiving acoustic guidance waves emitted by the acoustic transmitter of the base; and the processing unit is also configured to be able, when the vehicle is decoupled from the floor of the seabed, to operate in a movement guidance mode according to which the processing unit is configured to:

determine the direction of the acoustic guidance waves emitted by the acoustic transmitter of the base which are received by said at least two sensors of said measuring system;

generate and transmit to the navigation system guidance data relating to the determined direction of the acoustic waves received, the navigation system being configured to control the system for driving and steering the vehicle as a function of the guidance data so as to guide the movement of the vehicle toward the base.

2. The vehicle as claimed in claim 1, wherein the autonomous underwater vehicle has a weight in water of greater than five kilograms.

3. The vehicle as claimed in claim 1, wherein the three acceleration or speed sensors of the measuring system have a noise level of less than 50 ng/√Hz.

4. The vehicle as claimed in claim 1, wherein the three acceleration or speed sensors of the measuring system which are capable of receiving seismic waves are also capable of receiving acoustic guidance waves emitted by the acoustic transmitter of the base, and, in movement guidance mode, the processing unit is configured to determine the direction of the acoustic guidance waves emitted by the acoustic transmitter of the base which are received by the three sensors of said measuring system.

5. The vehicle as claimed in claim 1, wherein the housing comprises a wall capable of coming into contact with the floor, said measuring system making it possible to receive seismic waves in the coupled state in which the vehicle is coupled with the floor of the seabed.

6. The vehicle as claimed in claim 1, wherein the measuring system is coupled to the wall of the housing capable of coming into contact with the floor, so as to be able to receive the seismic waves when the vehicle is coupled to the floor of the seabed to carry out a seismic acquisition operation.

7. The vehicle as claimed in claim 1, wherein said acceleration or speed sensors of the measuring system are accelerometers formed by a microelectromechanical system.

8. The vehicle as claimed in claim 1, wherein the measuring system also comprises a hydrophone.

9. The vehicle as claimed in claim 1, wherein the measuring system and the processing unit are located on the same electronic board included in the housing of the vehicle.

10. The vehicle as claimed in claim 1, wherein the processing unit comprises an operating mode selection module making it possible to switch:

from seismic acquisition mode to allow a seismic acquisition operation to be carried out, to movement guidance mode.

11. An assembly comprising a vehicle as claimed in claim 1, and a recovery base which comprises an acoustic transmitter.

12. The assembly as claimed in claim 11, wherein the acoustic transmitter of the recovery base is configured to emit acoustic guidance waves with a frequency of between 50 and 800 Hz.

13. A method for guiding an autonomous underwater vehicle as claimed in claim 1, the method comprising the following steps:

positioning the vehicle relative to the floor of the seabed;

performing an operation for the acquisition of seismic data from the seismic waves received by the measuring system;

if the positioning of the vehicle includes coupling the vehicle to the seabed, then decoupling the vehicle from the floor of the seabed, reception by said measuring system of acoustic guidance waves emitted by the transmitter of the recovery base;

determining the direction of the acoustic guidance waves received;

controlling the movement of the vehicle toward the recovery base, as a function of the determined direction of the acoustic guidance waves received.

14. The method as claimed in claim 13, wherein determining the direction of the acoustic waves received by the measuring system and emitted by the transmitter of the base is carried out by:

an arc-tangent type method;

a method based on the intensity measured on each axis of said at least two sensors of the measuring system; or a beamforming method.

15. The method as claimed in claim 13, wherein the positioning of the vehicle relative to the floor of the seabed is achieved by coupling a wall of the housing of the vehicle with the floor.

16. The vehicle as claimed in claim 1, wherein the processing unit comprises an operating mode selection module making it possible to switch:

from seismic acquisition mode, which is activated when the vehicle is coupled with the floor of the seabed, to allow a seismic acquisition operation to be carried out, to movement guidance mode.

17. The vehicle as claimed in claim 1, wherein the autonomous underwater vehicle has a weight in water greater than 5 kg.

18. The vehicle as claimed in claim 1, wherein the three acceleration or speed sensors of the measuring system have a noise level of 15 ng/√Hz.

* * * * *